(12) United States Patent
Hou et al.

(10) Patent No.: US 8,854,573 B2
(45) Date of Patent: Oct. 7, 2014

(54) ELECTRONIC DEVICE

(71) Applicants: Tien-Hung Hou, Taipei (TW); Mei-Hsiung Tsai, Taipei (TW)

(72) Inventors: Tien-Hung Hou, Taipei (TW); Mei-Hsiung Tsai, Taipei (TW)

(73) Assignee: Compal Electronics, Inc., Taipei (TW)

( * ) Notice: Subject to any disclaimer, the term of this patent is extended or adjusted under 35 U.S.C. 154(b) by 144 days.

(21) Appl. No.: 13/714,434

(22) Filed: Dec. 14, 2012

(65) Prior Publication Data
US 2013/0162933 A1 Jun. 27, 2013

Related U.S. Application Data

(60) Provisional application No. 61/580,296, filed on Dec. 26, 2011.

(51) Int. Cl.
*G02F 1/1335* (2006.01)

(52) U.S. Cl.
CPC *G02F 1/13362* (2013.01); *G02F 2001/133531* (2013.01); *G02F 1/133528* (2013.01)
USPC .................................. 349/62; 349/65; 349/96

(58) Field of Classification Search
CPC ........ G02F 2001/133607; G02F 2001/133507; G02F 2001/133531; G02F 1/13362; G02F 1/133606; G02F 1/133615; G02F 1/133528; G02F 1/133504; G02F 1/133611; G02F 1/1335; G02F 1/1336; G02F 1/133524; G02F 2203/07; G02B 6/0053; G02B 6/0055; G02B 6/0051; G02B 6/0028; G02B 6/005; G02B 6/0025; G02B 6/00; G02B 6/0011; G02B 6/0016; G02B 5/02; G02B 5/3025; G02B 5/0231; G02B 5/04; G02B 5/30; G02B 27/285; G03F 7/70566; F21V 13/02; F21V 5/02; G09G 3/342; G09G 2310/024; G09G 2320/0233; G09G 3/003; B29D 11/00; B29D 11/00663
USPC ........ 349/62, 64, 96, 65, 67, 103, 99; 362/19, 362/606, 97.1, 339, 355; 359/485.02, 359/495.06, 489.09; 345/102, 87; 353/20
See application file for complete search history.

(56) References Cited

U.S. PATENT DOCUMENTS 8,013,962 B2 * 9/2011 Nishino et al. ................. 349/114
8,508,691 B2 * 8/2013 Miyamoto et al. .............. 349/64

* cited by examiner

*Primary Examiner* — Thoi Duong
(74) *Attorney, Agent, or Firm* — Jianq Chyun IP Office

(57) ABSTRACT

An electronic device including a display is provided. The display displays a received information content, and the information content has a horizontal direction. The display has a horizontal direction parallel to the information content's horizontal direction. The display includes a display panel, a backlight module and a first polarization unit. The backlight module is disposed at a side of the display panel, wherein the backlight module includes a horizontal prism sheet. The horizontal prism sheet includes a plurality of first prisms, wherein top angles of the first prisms are larger than or equal to 80 degrees and are smaller than 90 degrees. The display panel is located between the first polarization unit and the backlight module. A first angle between a transmission axis of the first polarization unit and the horizontal direction of the display is larger than 45 degrees and smaller than 135 degrees.

12 Claims, 4 Drawing Sheets

ELECTRONIC DEVICE

CROSS-REFERENCE TO RELATED APPLICATION

This application claims the priority benefit of U.S. provisional application Ser. No. 61/580,296, filed on Dec. 26, 2011. The entirety of the above-mentioned patent application is hereby incorporated by reference herein and made a part of this specification.

BACKGROUND

1. Field of the Invention

The invention relates to an electronic device.

2. Description of Related Art

When using an electronic device, such as a notebook computer, during the night or under a dark environment, a user is often unable to clearly identify buttons of a keyboard device due to the external environment being dim and unclear, such that the user may encounter an inconvenience in typing or may key-in an error command.

Although the notebook computer has a display, and the display may provide some luminosity when displaying an image, the luminosity provided by the display is insufficient to illuminate the entire keyboard, so that the user may still encounter an inconvenience in typing or may key-in an error command.

In addition, even if a light source is additionally installed on the top of the display for irradiating the keyboard, when light emitted from the light source is irradiated onto the keyboard, some portion of the light would generate a phenomenon of specular reflection, thus resulting in a glare. Therefore, the user is less likely to be able to clearly distinguish the texts on the keyboard buttons, and may encounter troubles in operation.

In order for the user to still be able to distinguish the keyboard buttons to perform operations under the dark environment, a conventional technology disposes a backlight source, such as a backlight source adopting a light-emitting diode, below the keyboard. Light emitted by the backlight source may upward irradiate at the bottom of the keyboard buttons, and by revealing the light through the translucent symbols or characters on the keyboard buttons, the user is still able to distinguish the keyboard buttons to perform the operations under the dark environment.

Since such practice requires disposing an additional backlight source below the keyboard, other than a cost of the electronic device being increased, a power consumption of the electronic device is also increased. In addition, when disposing the backlight source, a thickness of the keyboard is often led to be increased. Therefore, how to enable the user to distinguish the keyboard buttons to perform the operations under the dark environment, while maintaining a low cost and low power consumption under a condition of maintaining the thickness of the keyboard (an overall thickness of the electronic device), is in fact one of the current problems in need to be solved by R&D personnel.

SUMMARY OF THE INVENTION

The invention provides an electronic device configured to enhance an operation accuracy and convenience under a dark environment and reduce a proportion of glare in reflected light.

In an embodiment of the invention, an electronic device including a display is provided. The display displays a received information content, the information content has a horizontal direction, the display also has a horizontal direction, and the horizontal direction of the display and the horizontal direction of the information are parallel to each other. The display includes a display panel, a backlight module and a first polarization unit. The backlight module is disposed at a side of the display panel, wherein the backlight module includes a horizontal prism sheet. The horizontal prism sheet includes a plurality of first prisms, wherein top angles of the first prisms are larger than or equal to 80 degrees and are smaller than 90 degrees. The display panel is located between the first polarization unit and the backlight module. A first angle between a transmission axis of the first polarization unit and the horizontal direction of the display is larger than 45 degrees and smaller than 135 degrees.

In an embodiment of the invention, the first angle ranges from 46 degrees to 70 degrees or ranges from 110 degrees to 134 degrees.

In an embodiment of the invention, the display panel is a twist nematic (TN) liquid crystal display panel, an in-plane switching (IPS) liquid crystal display panel, a fringe field switching (FFS) liquid crystal display panel, a multi-domain vertical alignment (MVA) liquid crystal display panel, a vertical alignment in-plane switching (VA-IPS) liquid crystal display panel, or a super twisted nematic (STN) liquid crystal display panel.

In an embodiment of the invention, the display further includes a second polarization unit. The second polarization unit is located between the display panel and the backlight module. A second angle between a transmission axis of the second polarization unit and the transmission axis of the first polarization unit substantially equals 90 degrees.

In an embodiment of the invention, the display panel further includes a liquid crystal layer, a first alignment layer and a second alignment layer. The first alignment layer is disposed between the liquid crystal layer and the first polarization unit. An alignment direction of the first alignment layer substantially parallels to a polarization direction of the first polarization unit. The second alignment layer is disposed between the liquid crystal layer and the second polarization unit. An alignment direction of the second alignment layer substantially parallels to a polarization direction of the second polarization unit.

In an embodiment of the invention, each first prism has two base angles with substantially the same degree.

In an embodiment of the invention, the electronic device further includes a base, and the display is connected to the base.

In an embodiment of the invention, the backlight module further includes a backlight source, wherein the horizontal prism sheet is disposed between the backlight source and the display panel.

In an embodiment of the invention, the backlight source includes a light guide plate and a light-emitting element. The light guide plate has a first surface, a second surface opposite to the first surface and a light incident surface connected to the first surface and the second surface, wherein the first surface is located between the horizontal prism sheet and the second surface. The light-emitting element is disposed beside the light incident surface.

In an embodiment of the invention, the backlight source further includes a reflective sheet disposed on the second surface.

In an embodiment of the invention, the backlight module further includes a vertical prism sheet disposed between the backlight source and the horizontal prism sheet.

In an embodiment of the invention, the vertical prism sheet includes a plurality of second prisms.

According to the foregoing, by designing the top angles of first prisms to be smaller than 90 degrees according to the embodiment of the invention, partial light emitted by the backlight module of the display is deflected in large angle and irradiates onto the base. Therefore, the operation and convenience under the dark environment are enhanced, and the user is able to clearly distinguish keyboard buttons to perform operations under the dark environment. In addition, through changing the direction of the transmission axis of the first polarization unit, the first angle between the transmission axis of the first polarization unit and the horizontal direction of the display is larger than 45 degrees and smaller than 135 degrees, and a proportion of the light in a horizontal polarization direction within the light emitted by the display is reduced. As such, a glare phenomenon in the reflected light may be reduced, the operation and convenience under the dark environment are further enhanced, and the user can clearly distinguish the keyboard buttons to perform the operations.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
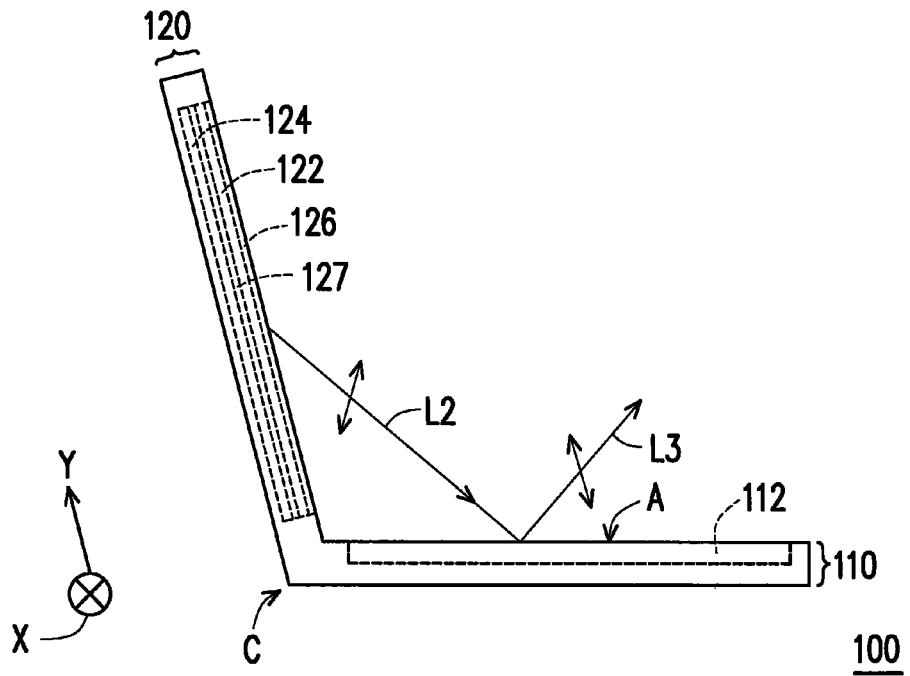
FIG. 1A and FIG. 1B are schematic side view diagrams illustrating an electronic device according to an embodiment of the invention.
Figure 1B:
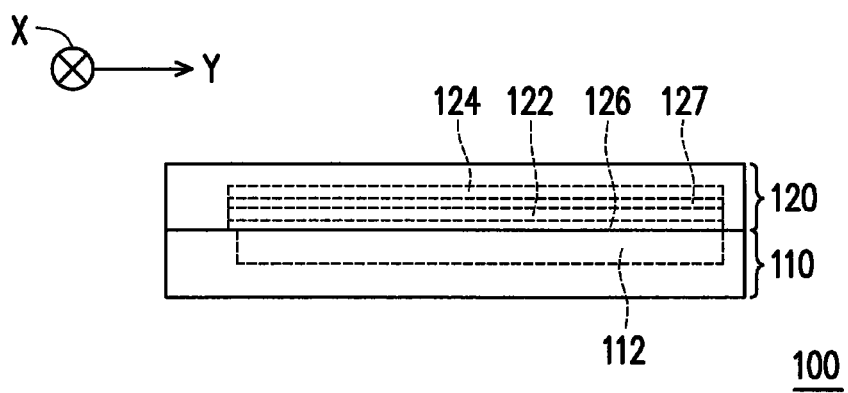

FIG. 1A and FIG. 1B respectively are schematic side view diagrams illustrating an electronic device at an unfolded state and a folding state according to an embodiment of the invention. Referring to FIG. 1A and FIG. 1B, an electronic device 100 according to this embodiment includes a display 120. The display 120 displays a received information content, wherein the information content has a horizontal direction (not shown), the display also has a horizontal direction X, and the horizontal direction X of the display parallels to the horizontal direction of the information content. In this embodiment, the horizontal direction X of the display, for example, is an extending direction of scan lines of a scan information content.

The electronic device 100 according to this embodiment, for example, is a notebook computer, but the invention is not limited thereto. Furthermore, the electronic device 100 according to this embodiment also includes a base 110 connected with the display 120. The display 120, for example, is rotatably connected to the base 110, and the display 120, by rotating with respect to the base 110, may cause the electronic device 100 to appear in the folded state (as the state illustrated in FIG. 1A) and the unfolded state (as the state illustrated in FIG. 1B), but the type of display 120 is not specifically limited by this embodiment.

In detail, the display 120, for example, uses a connection C between the base 110 and display 120 as an axis of rotation and rotates with respect to the base 110. When the display 120 rotates towards a direction away from the base 110, the electronic device 100 may appear to be in the unfold state shown in FIG. 1A, and when the display 120 rotates towards a direction close to the base 110, the electronic device 100 may appear to be in the folded state shown in FIG. 1B.

In this embodiment, the base 110 has an area for illumination A, the base 110 includes an input interface 112, and the input interface 112 is disposed in the area for illumination A. The input interface 112 according to this embodiment, for example, is a keyboard, but the invention is not limited thereto.

The display 120 includes a display panel 122, a backlight module 124 disposed at a side of the display panel 122 and a first polarization unit 126, wherein the display panel 122 is located between the backlight module 124 and the first polarization unit 126. Furthermore, when the electronic device 100 appears to be in the folding state (illustrate in FIG. 1B), the first polarization unit 126 is located between the display panel 122 and the backlight module 124, and the display panel 122 is located between the backlight module 124 and the first polarization unit 126. In this embodiment, the first polarization unit 126, for example, is a polarizer.

Figure 2:
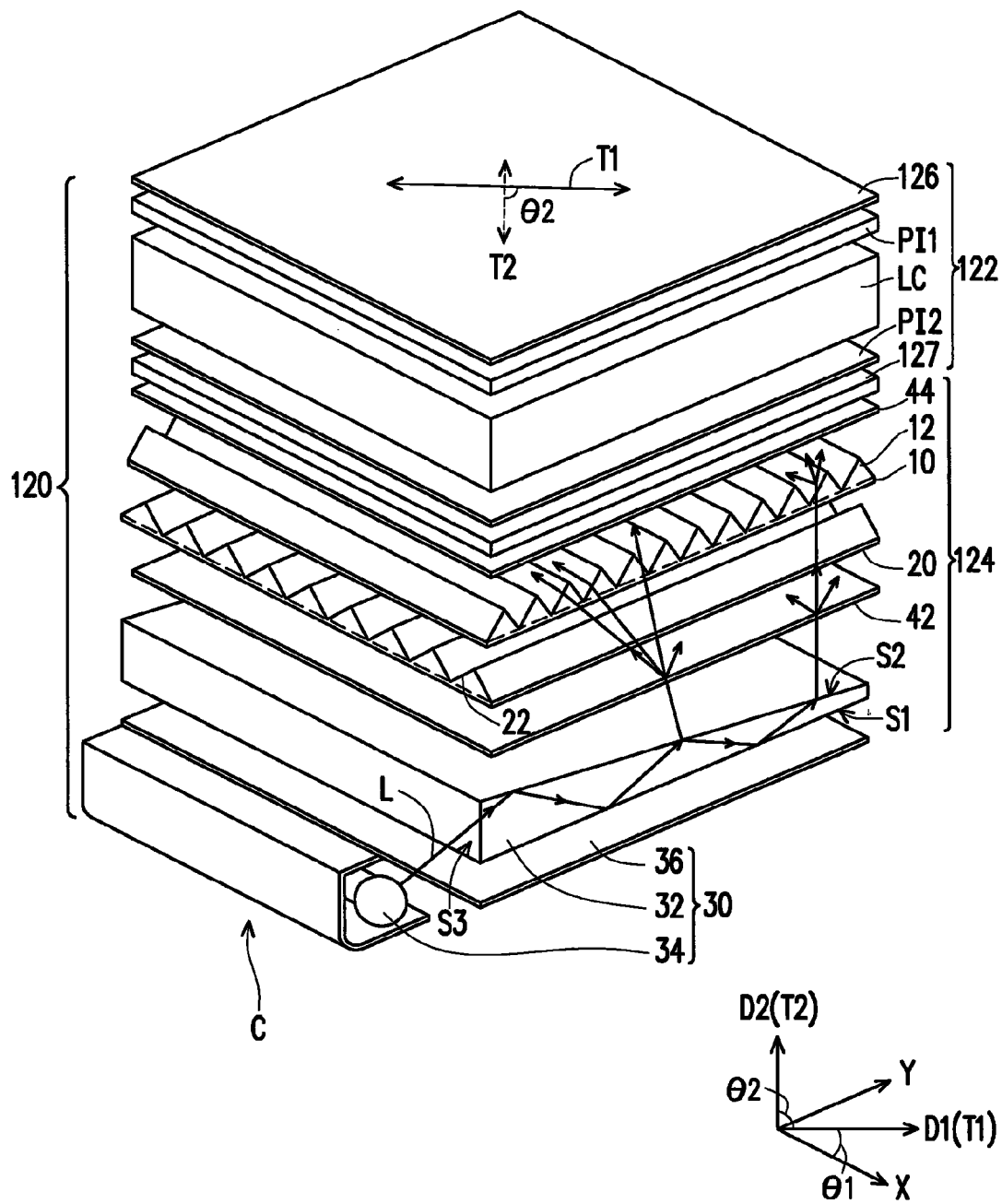
FIG. 2 is a schematic diagram illustrating a display in FIG. 1A or FIG. 1B.

The following below provides further descriptions of the display 120 with accompany of FIG. 2. FIG. 2 is a schematic diagram illustrating the display 120 in FIG. 1A or FIG. 1B. Referring to FIG. 2, the backlight module 124 of the display 120 includes a horizontal prism sheet 10. The horizontal prism sheet 10 includes a plurality of first prisms 12. In this embodiment, each first prism 12, for example, is a prism column, each first prism 12 extends along a direction (viz. the horizontal direction X) of the connection C substantially parallel to the base 110 (illustrate in FIG. 1A and FIG. 1B) and the display 120 (illustrate in FIG. 1A and FIG. 1B), and the first prisms 12 are arranged along a direction (a vertical direction Y of a vertical information content) substantially perpendicular to the connection C. In addition, top angles $\theta_{T1}$ (illustrated in FIG. 3A) of the first prisms 12 point towards the display panel 122.

Moreover, the backlight module 124 according to this embodiment may further include a vertical prism sheet 20, wherein the horizontal prism sheet 10 is disposed between the vertical prism sheet 20 and the display panel 122. The vertical prism sheet 20 includes a plurality of second prisms 22. In this embodiment, each second prism 22, for example, is a prism column, the second prisms 22 are arranged along a direction (viz. the horizontal direction X) substantially parallel to the connection C between the base 110 (illustrated in FIG. 1A and FIG. 1B) and the display 120 (illustrated in FIG. 1A and FIG. 1B), and each second prism 22 extends along a direction (viz. the vertical direction Y) substantially perpendicular to the connection C. In addition, top angles $\theta_{T2}$ (illustrated in FIG. 3B) of the second prisms 22 point towards the display panel 122.

Figure 3A:
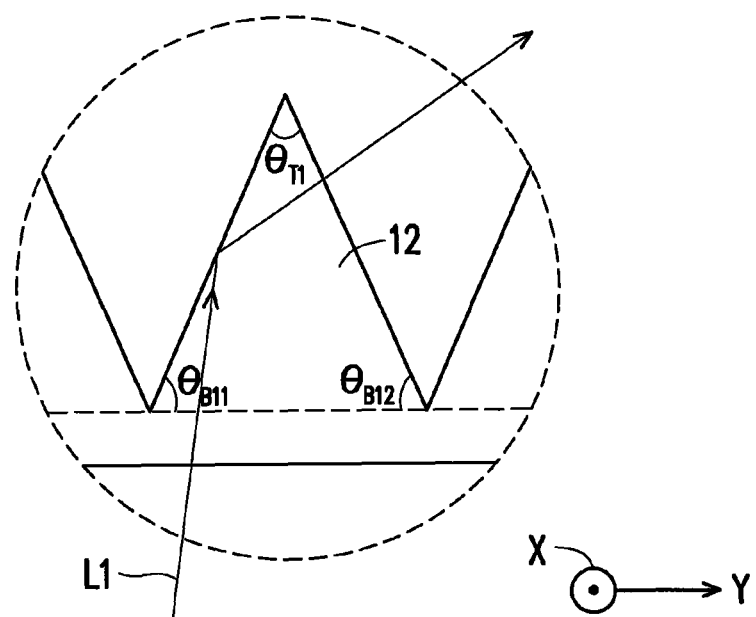
FIG. 3A and FIG. 3B are enlarged schematic diagrams respectively illustrating first prisms and second prisms in FIG. 2.
Figure 3B:
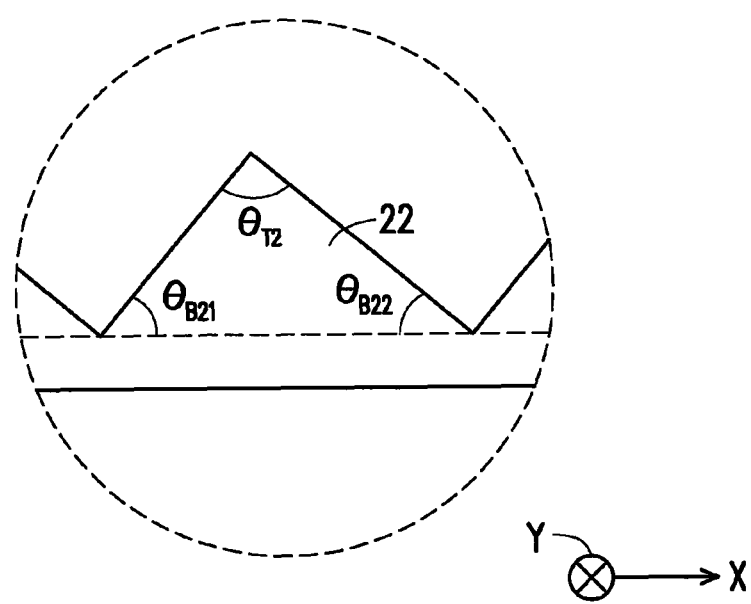

FIG. 3A and FIG. 3B are enlarged schematic diagrams respectively illustrating the first prisms 12 and the second prisms 22 in FIG. 2. Referring to FIG. 3A and FIG. 3B, the top angles $\theta_{T1}$ of the first prisms 12 according to this embodiment, for example, are larger than or equal to 80 degrees and smaller than 90 degrees, and the first prisms 12, for example, have two base angles $\theta_{B11}$, $\theta_{B12}$ with substantially the same degree, but the invention is not limited thereto. In other embodiments, designs of the base angle $\theta_{B11}$ and the base angle $\theta_{B12}$ may also be different depending on the actual needs. On the other hand, the top angles $\theta_{T2}$ of the second prisms 22 according to this embodiment, for example, substantially equal 90 degree, and the second prisms 22, for example, have two base angles $\theta_{B21}$, $\theta_{B22}$ with substantially the same degree, but the invention is not limited thereto. In other embodiments, designs of the base angle $\theta_{B21}$ and the base angle $\theta_{B22}$ may also be different depending on the actual needs.

Referring to FIG. 2, the backlight module 124 of the present embodiment may further include a backlight source 30, wherein the horizontal prism sheet 10 is disposed between the backlight source 30 and the display panel 122. In this embodiment, the backlight source 30, for example, is a side light type backlight source, but the invention is not limited thereto. In other embodiments, the backlight source 30 may also be a direct type backlight source.

Furthermore, the backlight source 30 according to this embodiment may include a light guide plate 32 and a light-emitting element 34. The light guide plate 32 has a first surface S1, a second surface S2 opposite the first surface S1 and a light incident surface S3 connected to the first surface S1 and the second surface S2. Specifically, the first surface S1 is located between the horizontal prism sheet 10 and the second surface S2, and this first surface S1 is actually a light-emitting surface of the light guide plate 32. The light-emitting element 34 is disposed beside the light incident surface S3, and the light-emitting element 34 may be a lamp or a light-emitting diode.

In addition, the backlight source 30 may further include a reflective sheet 36, wherein the reflective sheet 36 is disposed on the second surface S2, and the light guide plate 32 is located between the reflective sheet 36 and the horizontal prism sheet 10. The reflective sheet 36 is adapted to reflect the light transmitted to the reflective sheet 36 to the first surface S1, so as to enhance the chances of outputting the light emitted by the light-emitting element 34 from the backlight module 124.

Moreover, the backlight module 124 according to this embodiment may further include diffusion sheets 42, 44, so that a distribution of the light outputted from the backlight module 124 is more uniform. The diffusion sheet 42, for example, is located between the light guide plate 32 and the vertical prism sheet 20, and the diffusion sheet 44, for example, is located between the display panel 122 and the horizontal prism sheet 10.

Referring to FIG. 1A, FIG. 2 and FIG. 3A at the same time, the light guide plate 32 and the reflective sheet 36 may guide the light L1 emitted by the light-emitting element 34 to the horizontal prism sheet 10. In this embodiment, by designing the top angles $\theta_{T1}$ of the first prisms 12 to be smaller than 90 degrees, a portion of the light L1 entering the first prisms 12 may be emitted out with a large angle, so that an illumination range of the light L2 emitted out by the display 120 may cover the area for illumination A. Therefore, by guiding a portion of the light L2 emitted out by the display 120 towards the area for illumination A, the base 110 (or the input interface 112) according to this embodiment, without being disposed with an additional backlight source thereunder, may cause the user to distinguish the keyboard buttons to perform the operations under the dark environment and enhance the operation accuracy and convenience under the dark environment. In addition, since rather than adopting a backlight source below the base 110, the light emitted by the display 120 is adopted to irradiate the base 110, an electronic device of the horizontal prism sheet 10 according to this embodiment may maintain a low cost and low power consumption, and may have a relatively thin base 110.

Referring to FIG. 2, the display 120 according to this embodiment may further include a second polarization unit 127. In this embodiment, the second polarization unit 127, for example, is a polarizer. The display panel 122 may include a liquid crystal layer LC, a first alignment layer PI1 and a second alignment layer PI2, wherein the liquid crystal layer LC is disposed between the first alignment layer PI1 and the second alignment layer PI2, the first alignment layer PI1 is disposed between the liquid crystal layer LC and the first polarization unit 126, and the second alignment layer PI2 is disposed between the liquid crystal layer LC and the second polarization unit 127.

Furthermore, the first angle θ1 is between the transmission axis T1 of the first polarization unit 126 and the horizontal direction X. The second angle θ2 is between the transmission axis T2 of the second polarization unit 127 and the transmission axis T1 of the first polarization unit 126. In this embodiment, the second angle θ2 is substantially 90 degrees. However, in the other embodiments, the second angle θ2 may also substantially be 0 degree. When configuring the display 120 to a normally black mode or a normally white mode, the second angle θ2 may suitably be configured to substantially 0 degree or substantially 90 degrees depending on the actual needs.

The following below describes the operation principle of display panel 122. The display panel 122 may be a twisted nematic liquid crystal display panel, an in-plane switching liquid crystal display panel, a fringe field switching liquid crystal display panel, a multi-domain vertical alignment liquid crystal display panel, a vertical alignment in-plane switching liquid crystal display panel, or a super twisted nematic liquid crystal display panel.

It is to be understood that an electrode design of the display panel 122, and the alignment directions D1, D2 of the first alignment layer PI1 and the second alignment layer PI2 are related to the type of the display panel 122, and therefore, the following electrode design and alignment directions D1, D2 of the first alignment layer PI1 and the second alignment layer PI2 are not intended for limiting the invention, and one of ordinary skill in the arts would be able to modify the electrode design of the display panel 122 and the alignment directions D1, D2 of the first alignment layer PI1 and the second alignment layer PI2 targeting different types of display panel 122, so as to achieve a similar or the same effect or efficacy.

In this embodiment, the display panel 122, for an example, is the twisted nematic liquid crystal display panel, and the liquid crystal molecules in the liquid crystal layer LC, for example, are twisted nematic liquid crystal molecules, but the invention is not limited thereto. The display panel 122 may further include two electrode layers (not shown) respectively disposed at two opposite sides of the liquid crystal layer LC, so as to drive the liquid crystal molecules within the liquid crystal layer LC. The first alignment layer PI1 and the second alignment layer PI2 are respectively located on the two electrode layers, and the first alignment layer PI1 and the second alignment layer PI2 are respectively located between the liquid crystal layer LC and the electrode layers.

In addition, the alignment direction D1 of the first alignment layer PI1, for example, is substantially parallel to a polarization direction (i.e. a direction of the transmission axis T1) of the first polarization unit 126, and the alignment direction D2 of the second alignment layer PI2, for example, is substantially parallel to a polarization direction (i.e. a direction of the transmission axis T2) of the second polarization unit 127. In other words, an angle of 90 degrees may also be formed between the alignment direction D1 and the alignment direction D2 according to this embodiment.

In this embodiment, the principle of Brewster's angle is applied to lower a proportion of glare. Herein, the glare refers to a phenomenon of making a keyboard surface within the area for illumination to become bright in overall due to a specular reflection, and making it difficult to identify a text on the keyboard and a background color of the keyboard next to the text.

Figure 4:
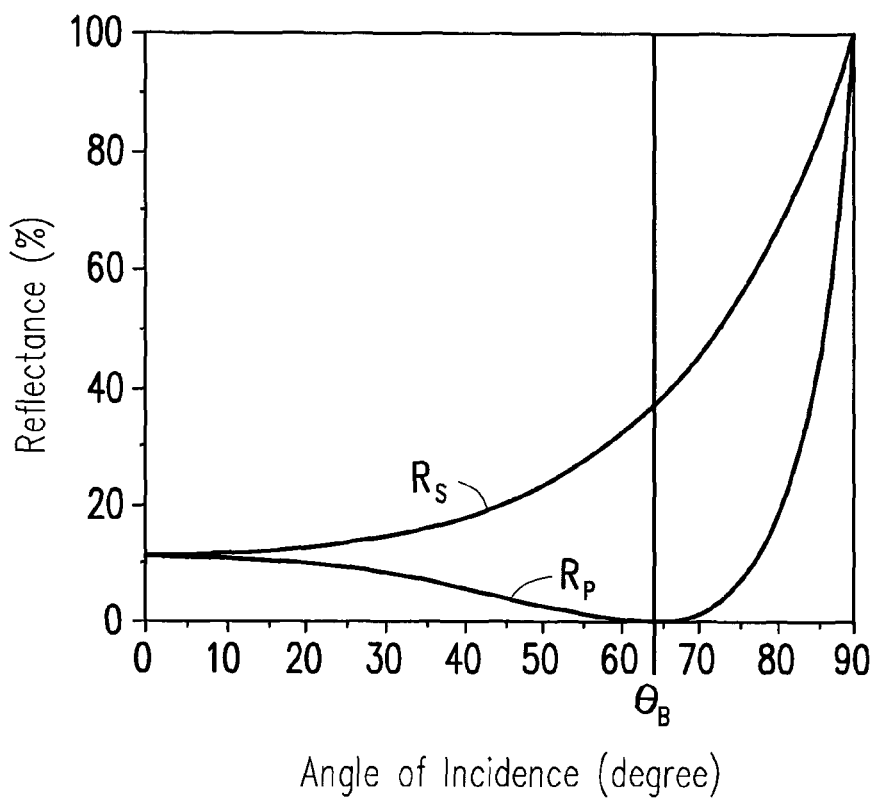
FIG. 4 is a diagram illustrating a reflectance of light with p polarization and light with s polarization at different angles of incidence.
Figure 5:
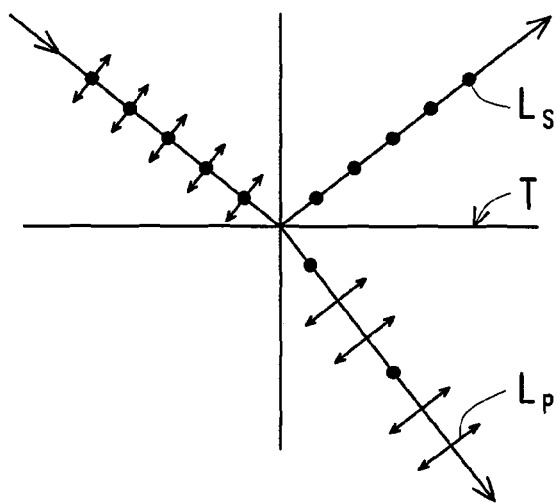
FIG. 5 illustrates traveling paths of the light with p polarization and the light with s polarization at Brewster's angle.

FIG. 4 is a diagram illustrating a reflectance of light with p polarization and light with s polarization under different angles of incidence. FIG. 5 illustrates traveling paths of the light with p polarization and the light with s polarization at Brewster's angle. Referring to FIG. 4 and FIG. 5, at different angles of incidence, the light of polarization directions Ls, Lp has different reflectances Rs, Rp. When an angle of incidence is a Brewster's angle $\theta_B$, the light of the p polarization (the polarization direction Lp) is completely refracted, and the light of the s polarization (the polarization direction Ls) is partially reflected and partially refracted. The polarization direction Ls of the s polarization pattern is a polarization direction parallel to a surface of incidence T, wherein the surface of incidence T is an interface of a sparse medium and a dense medium. In FIG. 5, the sparse medium is located above a surface of incidence T, and the dense medium is located below the surface of incidence T. The polarization direction Lp of the p polarization is a polarization direction perpendicular to the s polarization direction. In this embodiment, the polarization direction Ls of the s polarization substantially parallels to the direction X.

In this embodiment, by designing the first angle $\theta 1$ between the transmission axis T1 and the direction X to be larger than 45 degrees and smaller than 135 degrees, a proportion of the s polarized light reflected by the input interface 112 may be lowered, thereby lowering the proportion of glare. Herein, the glare is the light reflected by a mirror, namely, the light of the s polarization. Referring to FIG. 1A, FIG. 2 and FIG. 5, specifically, when the light L1 emitted by the light-emitting element 34 is transmitted to the second polarization unit 127, the light L1 becomes a polarized light, and a direction of this polarized light parallels to the alignment direction D2 (viz. the direction of the transmission axis T2 of the second alignment layer PI2). Under no voltage being applied, the liquid crystal molecules at the two sides of the liquid crystal layer are arranged according to the alignment directions D1, D2, so that the liquid crystal molecules in the center of the liquid crystal layer are gradually rotated from the alignment direction D2 of the second polarization unit 127 to the alignment direction D1 of the first polarization unit 126 with 90 degrees (viz. an angle between the alignment direction D1 and the alignment direction D2), so as to transmit the polarized light through the first polarization unit 126 and output from the display 120. Herein, the polarization direction of the light L2 outputted from the display 120 is parallel to the direction of the transmission axis T1 (or the alignment direction D1).

In this embodiment, by designing the first angle $\theta 1$ between the transmission axis T1 and the direction X to be larger than 45 degrees and smaller than 135 degrees, a proportion of the light Lp of the p polarization in the light L2 becomes larger, and a proportion of the light Ls of the s polarization becomes lesser. As such, when the light L2 irradiates onto the input interface 112 (keyboard) in the area for illumination A, the proportion of the s polarized light reflected by the input interface 112 may be lowered, thereby lowering the proportion of glare and the phenomenon of specular reflection, so that a reflected light L3 enters into an eye of the user via a diffusion or diffuse reflection. Therefore, the user is able to clearly distinguish the keyboard buttons to perform the operations, and the operation accuracy and convenience under the dark environment are enhanced.

It is to be understood that when the first angle $\theta 1$ is 90 degrees, after the light L1 emitted by the light-emitting element 34 passed through the first polarization unit 126, the proportion of the light in the horizontal polarization direction (viz. the direction X) within the outputted light L2 is theoretically 0 (viz. no light of the s polarization is presented within the light L2). Under this kind of design, an occurrence of the phenomenon of glare may significantly be inhibited. However, in an embodiment, under a consideration of grayscale inversion, the first angle $\theta 1$ may range from 46 degrees to 70 degrees, or from 110 degrees to 134 degrees, such that the phenomenon of glare (viz. the specularly reflected light) may be lowered, and a phenomenon of grayscale inversion can be overcome, and thereby the user is able to clearly distinguish the keyboard buttons to perform the operations under a maintenance of favorable display quality.

It is to be understood that the alignment directions D1, D2 of the first alignment layer PI1 and the second alignment layer PI2 are only designs under the twisted nematic liquid crystal display panel, but the invention does not intended to limit the type of the display panel and the alignment directions D1, D2 of the first alignment layer PI1 and the second alignment layer PI2; instead, the first angle $\theta 1$ between the transmission axis T1 and the direction X may be adjusted for overcoming the phenomenon of glare according to this embodiment.

In summary, by designing the top angles of first prisms to be smaller than 90 degrees according to the embodiment of the invention, partial light emitted by the backlight module of the display is deflected in large angle and irradiates onto the area for illumination of the base. Therefore, without disposing an additional backlight source below the base (or the input interface), the user is able to clearly distinguish keyboard buttons to perform operations under the dark environment, and the operation and convenience under the dark environment are enhanced. In addition, since rather than adopting a backlight source below the base, the light emitted by the display is adopted to irradiate the base, the electronic device of the horizontal prism sheet according to this embodiment may maintain a low cost and low power consumption, and may have a relatively thin base. Moreover, through changing the direction of the transmission axis of the first polarization unit, the first angle between the transmission axis of the first polarization unit and the horizontal direction of the display is larger than 45 degrees and smaller than 135 degrees, so as to reduce the proportion of the light in the horizontal polarization direction within the light emitted by the display. As such, the phenomenon of glare (viz. the specularly reflected light) may be overcome, thereby further enhancing the operation accuracy and convenience under the dark environment, so that the user is able to clearly distinguish the keyboard buttons to perform the operations.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device comprising:
a display displaying a received information content, the information content having a horizontal direction, the display having a horizontal direction, the horizontal direction of the display and the horizontal direction of the information content being parallel to each other, the display comprising:
a display panel;
a backlight module disposed at a side of the display panel, wherein the backlight module comprises a horizontal prism sheet, the horizontal prism sheet comprises a plurality of first prisms, and top angles of the first prisms are larger than or equal to 80 degrees and smaller than 90 degrees; and
a first polarization unit, wherein the display panel is located between the first polarization unit and the backlight module, and a first angle between a transmission axis of the first polarization unit and the horizontal direction of the display is larger than 45 degrees and smaller than 135 degrees.

2. The electronic device as recited in claim 1, wherein the first angle ranges from 46 degrees to 70 degrees or ranges from 110 degrees to 134 degrees.

3. The electronic device as recited in claim 1, wherein the display panel is a twisted nematic liquid crystal display panel, an in-plane switching liquid crystal display panel, a fringe field switching liquid crystal display panel, a multi-domain vertical alignment liquid crystal display panel, a vertical alignment in-plane switching liquid crystal display panel, or a super twisted nematic liquid crystal display panel.

4. The electronic device as recited in claim 1, wherein the display further comprising:
a second polarization unit located between the display panel and the backlight module, wherein a second angle between a transmission axis of the second polarization unit and the transmission axis of the first polarization unit substantially equals 90 degrees.

5. The electronic device as recited in claim 4, wherein the display panel further comprising:
a liquid crystal layer;
a first alignment layer disposed between the liquid crystal layer and the first polarization unit, wherein an alignment direction of the first alignment layer substantially parallels to a polarization direction of the first polarization unit; and
a second alignment layer disposed between the liquid crystal layer and the second polarization unit, wherein an alignment direction of the second alignment layer substantially parallels to a polarization direction of the second polarization unit.

6. The electronic device as recited in claim 1, wherein each first prism has two base angles with substantially the same degree.

7. The electronic device as recited in claim 1 further comprising a base, wherein the display is connected to the base.

8. The electronic device as recited in claim 1, wherein the backlight module further comprising a backlight source, wherein the horizontal prism sheet is disposed between the backlight source and the display panel.

9. The electronic device as recited in claim 8, wherein the backlight source comprises:
a light guide plate having a first surface, a second surface opposite to the first surface and a light incident surface connected to the first surface and the second surface, wherein the first surface is located between the horizontal prism sheet and the second surface; and
a light-emitting element disposed beside the light incident surface.

10. The electronic device as recited in claim 9, wherein the backlight source further comprises a reflective sheet disposed on the second surface.

11. The electronic device as recited in claim 8, wherein the backlight module further comprises a vertical prism sheet disposed between the backlight source and the horizontal prism sheet.

12. The electronic device as recited in claim 11, wherein the vertical prism sheet comprises a plurality of second prisms.

* * * * *